United States Patent
Newman

(10) Patent No.: US 10,324,293 B2
(45) Date of Patent: Jun. 18, 2019

(54) VISION-ASSISTED INPUT WITHIN A VIRTUAL WORLD

(71) Applicant: Compedia Software and Hardware Development Ltd., Ramat Gan (IL)

(72) Inventor: Shai Newman, Rosh-Ha'Ayin (IL)

(73) Assignee: Compedia Software and Hardware Development Ltd., Ramat Gan (IL)

(*) Notice: Subject to any disclaimer, the term of this patent is extended or adjusted under 35 U.S.C. 154(b) by 9 days.

(21) Appl. No.: 15/437,476

(22) Filed: Feb. 21, 2017

(65) Prior Publication Data

US 2017/0307889 A1    Oct. 26, 2017

Related U.S. Application Data

(60) Provisional application No. 62/298,492, filed on Feb. 23, 2016.

(51) Int. Cl.
| | | |
|---|---|---|
| *G02B 27/01* | (2006.01) | |
| *G06F 3/03* | (2006.01) | |
| *G06F 3/01* | (2006.01) | |
| *G06F 3/0481* | (2013.01) | |
| *G06F 3/0354* | (2013.01) | |
| *G06F 3/023* | (2006.01) | |
| *G06T 17/05* | (2011.01) | |
| *G06F 3/041* | (2006.01) | |
| *G06F 3/02* | (2006.01) | |

(52) U.S. Cl.
CPC ....... *G02B 27/0172* (2013.01); *G02B 27/017* (2013.01); *G02B 27/0176* (2013.01); *G06F 3/01* (2013.01); *G06F 3/011* (2013.01); *G06F 3/017* (2013.01); *G06F 3/023* (2013.01); *G06F 3/0304* (2013.01); *G06F 3/03547* (2013.01); *G06F 3/04812* (2013.01); *G06F 3/04815* (2013.01); *G02B 2027/0134* (2013.01); *G02B 2027/0138* (2013.01); *G02B 2027/0141* (2013.01); *G02B 2027/0187* (2013.01); *G06F 3/02* (2013.01); *G06F 3/0416* (2013.01); *G06T 17/05* (2013.01)

(58) Field of Classification Search
USPC .......................................... 345/8
See application file for complete search history.

(56) References Cited

U.S. PATENT DOCUMENTS

| | | | | |
|---|---|---|---|---|
| 8,773,512 B1* | 7/2014 | Rafii | ...................... | G06F 3/017 348/47 |
| 2006/0112173 A1* | 5/2006 | Cohn | ...................... | G06F 3/0605 709/220 |

(Continued)

*Primary Examiner* — Chineyere D Wills-Burns
(74) *Attorney, Agent, or Firm* — The Law Office of Joseph L. Felber

(57) ABSTRACT

A user wearing a virtual reality headset and holding a real-world input device, uses a finger to input data into the real-world input device under visual assistance within the virtual world. A corresponding virtual input device is positioned within the virtual world in a position similar to the position of the real-world input device relative to the headset, and a fingertip marker upon an input map of the virtual input device in the virtual world is positioned similar to the position of the real-world user's fingertip relative to the real-world input device, thus providing realistic visual assistance in the virtual world for reaching and stroking the desired key or point on the real-world input device.

8 Claims, 11 Drawing Sheets

(56) References Cited

U.S. PATENT DOCUMENTS

| | | | |
|---|---|---|---|
| 2010/0177035 A1* | 7/2010 | Schowengerdt | G06F 1/163 345/156 |
| 2013/0063386 A1* | 3/2013 | Kojima | G06F 3/03547 345/173 |
| 2015/0153950 A1* | 6/2015 | Chang | G06F 3/0426 715/773 |
| 2015/0235426 A1* | 8/2015 | Lyons | G02B 27/0172 345/8 |
| 2015/0293644 A1* | 10/2015 | Watanabe | G06F 3/0426 345/168 |

* cited by examiner

VISION-ASSISTED INPUT WITHIN A VIRTUAL WORLD

BACKGROUND OF THE INVENTION

Field of the Invention

The present invention relates to virtual reality, and in particular to user-controlled actions within a virtual world.

Description of Related Art

Virtual reality is a computer-simulated reality that replicates users' presence in places in the real world or an imagined world, allowing the users to explore, and, in some implementations, interact with that world. Virtual reality is based on artificially creating sensory experiences, primarily sight and hearing and possibly also touch and/or smell. Often, special-purpose headsets are worn by users to provide stereoscopic images and sound, for offering a lifelike experience. Virtual reality has found many applications, such as in games and movies for entertainment, in education, or in professional or military training.

Users immersed in a virtual world may want to use real-world input devices for controlling or enhancing their interaction with the virtual world, or for responding to real-world events such as answering a phone call or a text message. Blind operation of such input device may limit the range of the inputs options, compared to customary vision-assisted input options in the real world, such as when using in the real world a conventional touchscreen or keyboard.

The present disclosure concerns real-world input operations that are vision-assisted within a virtual world.

BRIEF SUMMARY OF THE INVENTION

Definitions

A "touchpad" is a device having a pressure-sensitive surface that recognizes touches by one or more fingers. Exemplary touchpads include touchscreens, computerized devices that include touchscreens, or blank touchpads. A "keypad" is a device having an arrangement of physical keys and/or buttons that recognize presses. Exemplary keypads include numeric keypads, alphanumeric keyboards or dedicated controllers that include buttons. A "handheld input device", also abbreviated "device", is a handheld apparatus that includes a touchpad and/or a keypad. The term "stroke sensors" is used herein to generalize the concepts of touch-sensitive elements of a touchpad or press-sensitive keys or buttons, while "strokes" herein mean touchpad touches or key/button presses.

A "virtual world" is a computer-based simulated environment affecting the rendering of computer-generated stereoscopic images that show backgrounds and objects of interest so that they look realistic to a user wearing a compatible virtual reality headset.

"Vision-assisted operation" of a handheld input device is where strokes may be guided by the user's vision, in contrast to blind operation. It will be noted that, in the present context, vision-assisted operation is performed by a user immersed in a virtual world, which requires introducing, within the virtual world, representations of both the handheld input device and a user's fingertip. Vision-assisted operation also requires displaying upon the handheld input device in the virtual world an "input map" that shows a touchscreen and/or keys and/or buttons, for indicating targets that the user may select for stroking in order to enter a desired input.

"Position" of an element relates to a spatial location and/or angular orientation of the element in the real-world or the perceived spatial location and/or angular orientation in the virtual world. Position may be referred-to in absolute terms, for example a headset's position within a room; or in relative terms, for example the position of a handheld input device or a fingertip relative to a headset. "To position" and "positioning" of an element have different meanings in the real and virtual worlds: in the real world they relate to inferring the current position of the element by sensors and processors; in the virtual world they relate to affecting the perceived position of the virtual version of the element via rendering. In the specific case of real-world positioning of a fingertip relative to a device, even a projection of the fingertip upon the device as seen from a headset may be considered adequate positioning, as long as such projection is sufficient for rendering a fingertip marker that effectively guides the user toward a selected point on the device.

The term "camera" herein relates to an image-capturing device that may actually include one or more two- or three-dimensional cameras, operating in the present context for detecting positions of objects and positions or projections of user fingers approaching devices. The term "accelerometers" herein refers to electronic components that measure translational and/or rotational acceleration (the latter also known as gyros).

The term "processor" herein relates to a combination of computing hardware and software programmed for executing predetermined processing and communication of data. The software part of the processor may be masked within the processor, stored in a nonvolatile storage device that forms part of the processor, or be loaded from a nonvolatile storage device that is physically separate from the processor.

BRIEF SUMMARY

The present invention seeks to provide user experience that is both efficient and realistic. For efficiently, the user is offered vision-assisted input methods that he or she is familiar with in the real world. For being realistic, the user's tactile experience in positioning and operating a touchpad or keypad in the real world is harmonized by the present disclosure's teachings with the position and operation of a virtual touchpad or keypad that the user, wearing a virtual reality headset, sees and operates within the virtual world. For realistic experience, the virtual touchpad or keypad that the user sees in the virtual world is similar in its shape, size and kind (e.g. touchpad or keypad) to the physical device he is holding and operating in the real world.

Customary input methods are mostly based on fingers stroking keys, buttons or touch-sensitive pads, with the specific character or control actuated by the strokes being determined by the stroking fingertips. Accordingly, the present vision-assisted input involves dynamically indicating, in the virtual world, the relative position of a user fingertip relative to the virtual input device similarly to the actual relative position of the real-world fingertip relative to the real-world input device. Also, for realistic experience, both the input device and the fingertip appear in the virtual world is relative positions to the user's eyes that are similar to the respective real-world relative positions of the input device and the fingertip to the headset in the real world.

According to preferred embodiments of the present invention there is thus provided a system for vision-assisted operation of a handheld input device while being immersed within a virtual world, the system comprising: a headset, that is a virtual reality headset wearable by a user; a device, that is a handheld input device having a plurality of stroke sensors; at least one device position sensor for sensing a real-world position of the device; at least one fingertip position sensor for sensing a real-world position of a fingertip of the user; and at least one processor.

The processor is programmed to: receive current device position data from the at least one device position sensor; receive current fingertip position data from the at least one fingertip position sensor; and calculate: (i) a current real-world relative position of the device, relative to the headset, according to the current device position data, and (ii) a current real-world relative position of the fingertip, relative to the headset or to the device, according to the current fingertip position data.

The processor is further programmed to render a stereoscopic view into the virtual world, the stereoscopic view showing, at least: (i) a virtual input device that has a current input map, the virtual input device positioned in the virtual world according to the current real-world relative position of the device, and (ii) a fingertip marker positioned relative the current input map of the virtual input device according to the current real-world relative position of the fingertip. The processor is also programmed to provide the stereoscopic view to the headset for presentation to the user, and repeat the receive, calculate, extract, render and provide steps until receiving a signal from a stroke sensor of the device, thereby providing the user with vision-assisted guidance for moving the fingertip relative to the device in the real world. When a signal from a stroke sensor is received, the processor recognizes an input signal according to the current input map and the signal received from the stroke sensor.

The system above may have all device position sensors forming part of the device, or all device position sensors forming part of the headset, or having device position sensors that are standalone sensors that do not form part of any of the device or the headset. The systems may also have all fingertip position sensors forming part of the headset, or including standalone sensors that do not form part of any of the device or the headset.

The processor may be further programmed to load the current input map prior to the render step, and the repeat the load step during the process iterations.

The system may further include a nonvolatile storage device storing a virtual world that includes objects of interest; headset position sensors for sensing a real-world current position of the headset; and wherein the render step further includes rendering objects of interest from the virtual world according to the real-world current position of the headset.

DETAILED DESCRIPTION OF PREFERRED EMBODIMENTS OF THE INVENTION

Figure 1A:
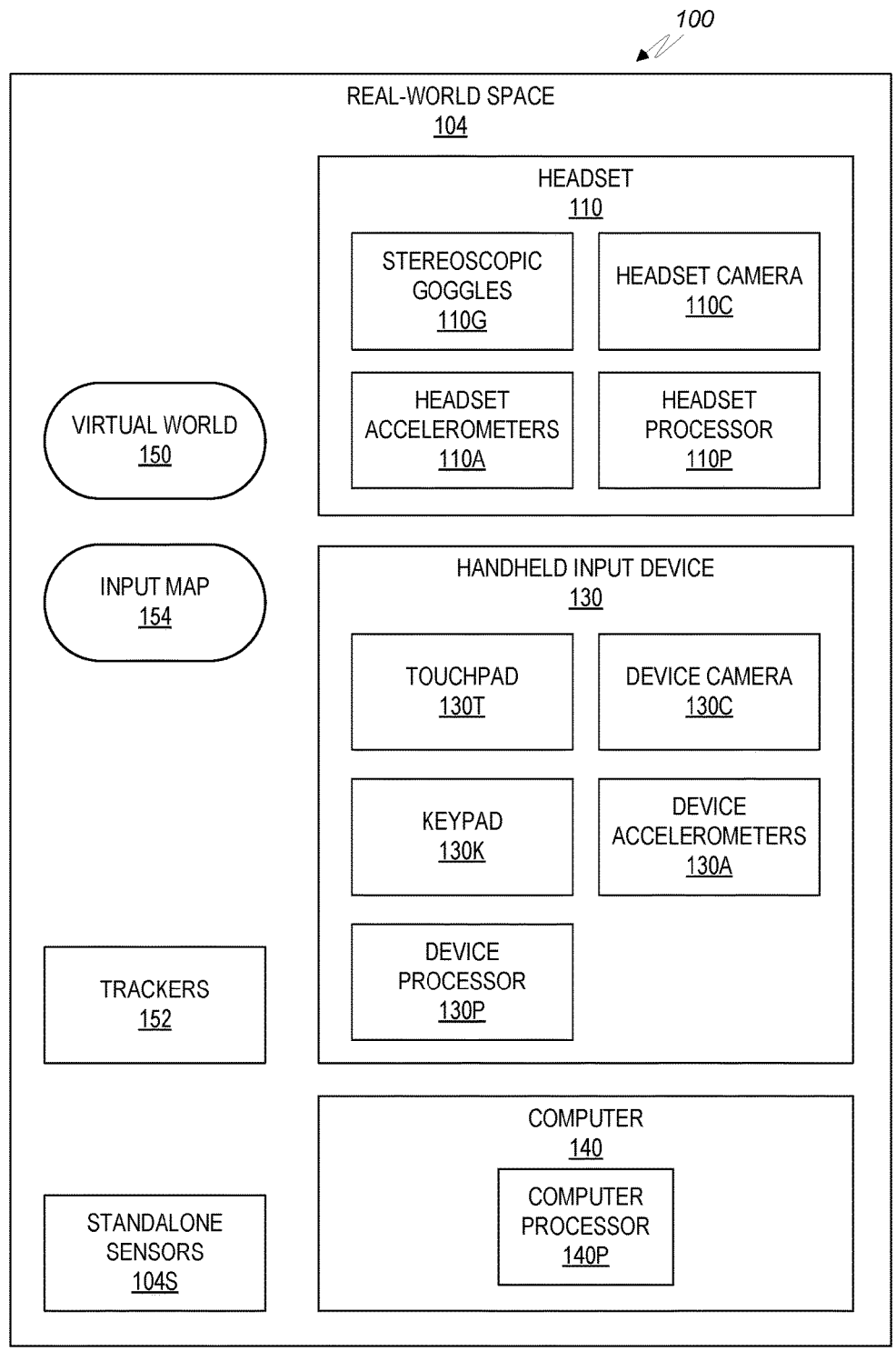
FIG. 1A depicts a system according to a preferred embodiment of the present invention.

Reference is made to FIG. 1A that depicts system 100 according to a preferred embodiment of the present invention. Real-world space 104, such as a room, accommodates a user wearing a headset 110 and holding a handheld input device 130. Optionally, the real-world space 104 also accommodates a computer 140, such as a personal computer, for running all or part of the processing tasks described below, in which case computer 140 communicates with headset 110 and handheld input device 130 via wired or wireless links (not shown in the drawing). Optional standalone sensors 104S are one or more cameras and/or other sensors, such as UWB (ultra wideband) sensors, fixed within real-world space 104 for tracking headset 110, handheld input device 130 and/or the user's fingertips in order to continuously acquire their respective positions. Each camera can be a two-dimensional or three-dimensional camera and can use different wave lengths including infrared. Virtual world 150 is data describing a static or dynamic virtual world stored in a nonvolatile storage device. Virtual worlds are common in the art of virtual reality and are based on 3D models that are created by tools like Autodesk 3ds Max by Autodesk, Inc. and other similar tools. The 3D models are then usually loaded into 3D engines, such as Unity3D by Unity Technologies, or Unreal by Epic Games. Such engines enable to use the 3D models of virtual worlds and add to them lighting and other properties and then render an image as seen from a specific position using technologies like ray tracing, that enable to build an image of the virtual world as it is seen from a specific location and point of view. Also known in the art is the technology of a virtual camera that is placed in a specific position in the virtual world and is also given some camera parameters, like field of view, which cause the 3D engine to generate an image as seen from that virtual camera. Stereoscopic view is acquired by placing two virtual cameras, one for each eye, usually at the distance of about 6 cm from each other which is an average distance between the human eyes. The above are standard practices of offering virtual world experience and there are numerous computer code packages and SDKs that enable professionals to build and manipulate complex virtual worlds. Input map 154 is data stored in a nonvolatile storage device and visually describing a stroke-sensitive surface of handheld input device 130, such as a touchscreen represented by touchpad 130T and/or a key layout represented by keypad 130K, so that, when viewed via headset 110, it is seen within the virtual world according to the positioning of handheld input device 130 and thus assists and guides the user in selecting which point on the stroke-sensitive surface he or she wishes to stroke. Virtual world 150 and input map 154 are actually implemented within of the nonvolatile memories of any or all of headset 110, handheld input device 130 and/or computer 140 (the memories not shown in the drawing), and their separate presentation as virtual world 150 and input map 154 within FIG. 1A comes to emphasize their distinct roles rather than their physical embodiment.

Headset 110 is wearable by a user and may include a pair of stereoscopic goggles 110G that display the virtual world 150 and additional elements, such as virtual representations of handheld input device 130 and a fingertip marker, for providing a realistic experience of being immersed and operating a device within the virtual world. Stereoscopic goggles 110G may include or be supplemented with headphones and microphone (not shown). Headset camera 110C is one or more two- or three-dimensional cameras located at the front of the headset and usually directed parallel to the user's line of sight when he or she is looking straight ahead. In some embodiments, the headset camera 110C may be a back camera of a smartphone that forms part of headset 110, or be an external accessory mounted on headset 110. The headset camera 110C may be used for tracking the position of headset 110, handheld input device 130 and the user's hand/fingertip in the real world or determine the projection of the user's hand/fingertip on the device, so that they can be realistically positioned in the virtual world relatively to the user's eyes, for realistic experience. Headset accelerometers 110A may be included within headset 110 and provide real-world orientation data usable for dynamically positioning headset 110 within the virtual world. Headset processor 110P controls the operation of the units of headset 110, the communication of headset 110 with the other units shown within real-world space 104, and optionally also undertakes all or part of the processing tasks associated with embedding handheld input device 130 and a fingertip marker into the virtual world viewed via stereoscopic goggles 110G, including the rendering of the image eventually provided to the user.

It will be noted that headset 110 may be implemented as a dedicated device, or include a smartphone that provides visual, sensing, processing and communication functionalities that supplement dedicated optics, body and harness. At the time of the present disclosure, exemplary dedicated virtual reality headsets include Oculus Rift by Oculus Virtual Reality, LLC; and VIVE by HTC Corporation. Exemplary smartphone-based virtual reality headsets include GaerVR by Samsung Electronics and Google Cardboard by Google Inc.

Handheld input device 130 includes touchpad 130T or keypad 130K or both. Touchpad 130T includes a touch-sensitive surface, such as a touchscreen or a blank or marked touchpad to be touched by a user, and serves as an input device that identifies single- or multi-finger gestures, such as tap, drag, pinch, spread, flick, hold, or rotate. For clarity and focus of the present disclosure, the discussion below will relate to only identifying the point on a touchscreen where an initial touch of a single user's fingertip is made, while the rest of the gesture will be made and interpreted conventionally and is out of the scope of the present disclosure. Keypad 130K includes mechanical keys and/or buttons to be selectively pressed by a user. The keys and buttons may be marked, as in conventional keyboards or control devices, or be left blank. Optional device camera 130C is one or more two- or three-dimensional cameras that form part of handheld input device 130 and can be used as sensors for positioning of headset 110, handheld input device 130 and/or a user's hand or fingertip. Optional device accelerometers 130A may be included to take part of the positioning of handheld input device 130, while device processor 130P controls the operation of the units of handheld input device 130, the communication of handheld input device 130 with other units within real-world space 104, and optionally also undertakes all or part of the processing tasks associated with embedding handheld input device 130 and a fingertip marker into the virtual world viewed via stereoscopic goggles 110G.

Trackers 152 are optionally fixed within real-world space 104 to facilitate positioning of a headset 110 by headset camera 110C and/or of handheld input device 130 by device camera 130C. Computer 140 is optionally included to offer the enhanced processing, storage and communication capabilities of a larger computer to the smaller headset 110 and/or handheld input device 130. Computer processor 140P may take part in transforming virtual world 150 into a realistic experience by a user wearing headset 110, and optionally also undertakes all or part of the processing tasks associated with embedding handheld input device 130 and a fingertip marker into the virtual world viewed via stereoscopic goggles 110G.

Figure 1B:
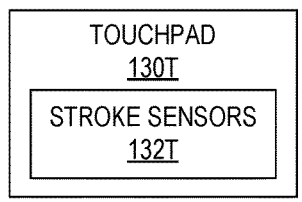
FIGS. 1B and 1C emphasize the generalized concept of stroking.
Figure 1C:
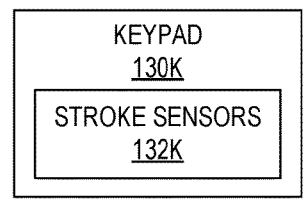

FIGS. 1B and 1C emphasize the generalized concept of stroking, relating to both touching a touchpad or pressing keys or buttons on a keypad. Thus, touchpad 130T, such as a common touchscreen, or a mobile device having a touchscreen, or a blank touchpad, typically includes a dense, large plurality of touch-sensitive sites, represented herein by stroke sensors 132T. Keypad 130K, such as a common numeric keypad, an alphanumeric keyboard or a control panel, includes a plurality of keys and/or buttons that can be mechanically pressed, each press detected by a respective one of stroke sensors 132K. Thus, stroke sensors are the stroke-sensitive elements of keypads or touchpads.

It will be noted that handheld input devices such as 130T/130K and their respective stroke sensors 132T/132K are real-world elements to be activated in the real world by finger strokes. However, under the present operation scenario, the user is wearing a virtual reality headset and thus feels, but does not directly see, the actual handheld input device. Therefore, whatever is realistically displayed on the touchpad (if it is implemented as a touchscreen) or on the keys of a keypad, is not seen by the user, and therefore irrelevant to the operation of the handheld input device by the user. What matters is the input map that determines what is seen by the user upon a virtual visual representation of the handheld input device within the virtual world, and transforms/translates signals from stroke sensors into actual inputs received from the user. As an example, a conventional numeric key having an imprinted character "2" in the real world, may be seen in the virtual world via headset 110, according to the input map, as a key of the handheld input device bearing the characters "Stop!", and the user will selectably press that button for stopping a process. As another example, a conventional touchscreen displaying an arbitrary pattern devised to assist the headset camera in tracking the touchscreen in the real world, may be displayed by the virtual reality headset to the user, according to the input map, as a virtual alphanumeric keyboard in the virtual world, and the user may touch a location on the virtual touchscreen that displays the letter "A" for inputting "A" into handheld input device 130.

Figure 1D:
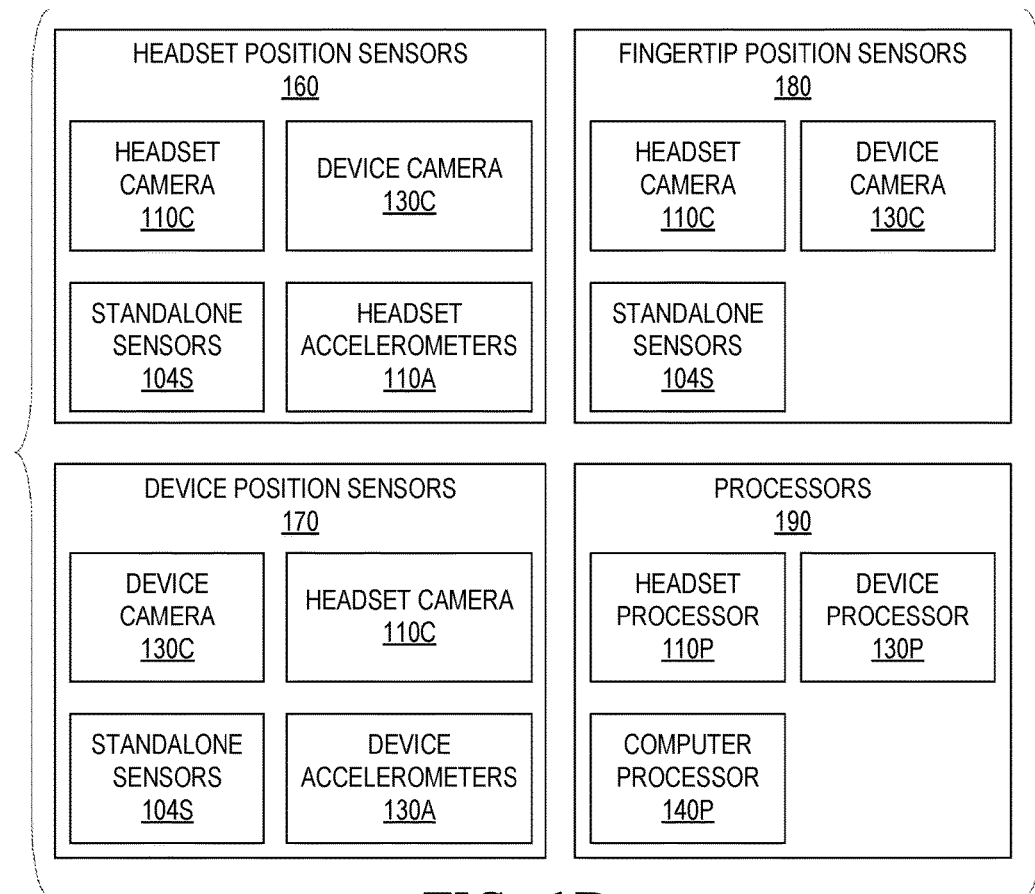
FIG. 1D demonstrates various options for implementing the functions of various sensors.

FIG. 1D demonstrates various options for implementing the functions of headset position sensors 160 that sense the position of headset 110, device position sensors 170 that sense the position of handheld input device 130, fingertip position sensors 180 that sense the position of fingertips, and processors 190 that perform the processes described in the present disclosure. Headset position sensors 160 sense the position of headset 110 relative to device 130. This can be done in several methods including: using a visual tracker that is shown in real-life on the touchscreen of the device 130; using the real-world visual, size, tactile and shape of the device as a visual tracker; using headset 3D camera to identify the surface of the device 130 by searching and identifying an object that is seen by the camera and has the characteristic of the device 130 like size and shape; using the orientation sensors of the headset 110 and the device 130; or a combination of the above. If the user is allowed to move within real-world space 104 and such motion is interpreted as moving in the virtual world, then headset position sensors 160 may also sense the location of headset 110 within real-world space 104. Headset position sensors 160 may include any or all of the following components, that send signals to processors 190 to determine the current position of headset 110: (i) headset camera 110C may identify predefined trackers (not shown in the drawing and can be two- and/or three-dimensional trackers) within real-world space 104 or on handheld input device 130; (ii) device camera 130C of handheld input device 130 may identify trackers on headset 110 which may be used by processors 190 to determine the relative position between headset 110 and handheld input device 130 or within real-world space 104; (iii) standalone sensors 104S distributed within real-world space 104 may be used for determining the position of headset 110 within real-world space 104; and (iv) headset accelerometers 110A may be used for determining the orientation of headset 110 with respect to the real world space.

Device position sensors 170 sense the position of handheld input device 130, with the ultimate goal of determining the relative position of handheld input device 130 with respect to headset 110, which actually determines how the virtual representation of handheld input device 130 is to be seen by the user within the virtual world. Device position sensors 170 may include any or all of the following components, that send signals to processors 190 to determine the current position of handheld input device 130 within the real-world space 104 or relatively to headset 110: (i) device camera 130C may detect visual trackers (including spatial features) on headset 110 that may be used by processors 190 to determine the relative device-headset position, and may also detect visual trackers in real-world space 104 (not shown and can be two- and/or three-dimensional trackers) that may be used to determine the position of handheld input device 130 within real-world space 104; (ii) headset camera 110C may identify visual trackers or, in case of a 3D camera identify also spatial features on handheld input device 130 that may be used by processors 190 to determine the relative device-headset position; (iii) standalone sensors 104S distributed within real-world space 104 may be used for determining the position (i.e. the location and/or orientation) of handheld input device 130 within real-world space 104; and (iv) device accelerometers 130A may be used for determining the orientation of handheld input device 130 with respect to the real-world space 104.

Fingertip position sensors 180 detect position of the user's fingertips, and preferably relative to handheld input device 130 and may include any combination of headset camera 110C, device camera 130C or standalone sensors 104S. It will be noted that stand alone sensors 104S may also include wearable sensors and/or visual trackers that can be placed on the user body, headset and device and then tracked by cameras or other sensors. It will be also noted that both device position sensors 170 and headset position sensors 160 can be used separately or in collaboration as fingertip and/or palm position sensors. The various position sensors can track the position of all or part of the following elements: the user palms 420R (FIG. 4A), the user fingertip 510R (FIG. 5A), the headset 110 and the device 130. Many combinations are available to supply the data needed for generating realistic experience. For example, knowing the headset position, the palm position and the device orientation, even just from its accelerometers, might infer that the user holds a device and then its relative position to the headset 110 can be calculated according to the real world relative position of the palms relative to the headset.

Processing of sensor readings for their transformation to determining positions and generating images may be distributed among the participating devices in various ways according to engineering considerations; accordingly, processors 190 generally encompass the processors that may be involved in the processes depicted in the present disclosure, which include headset processor 110P, device processor 130P and computer processor 140P.

Figure 1E:
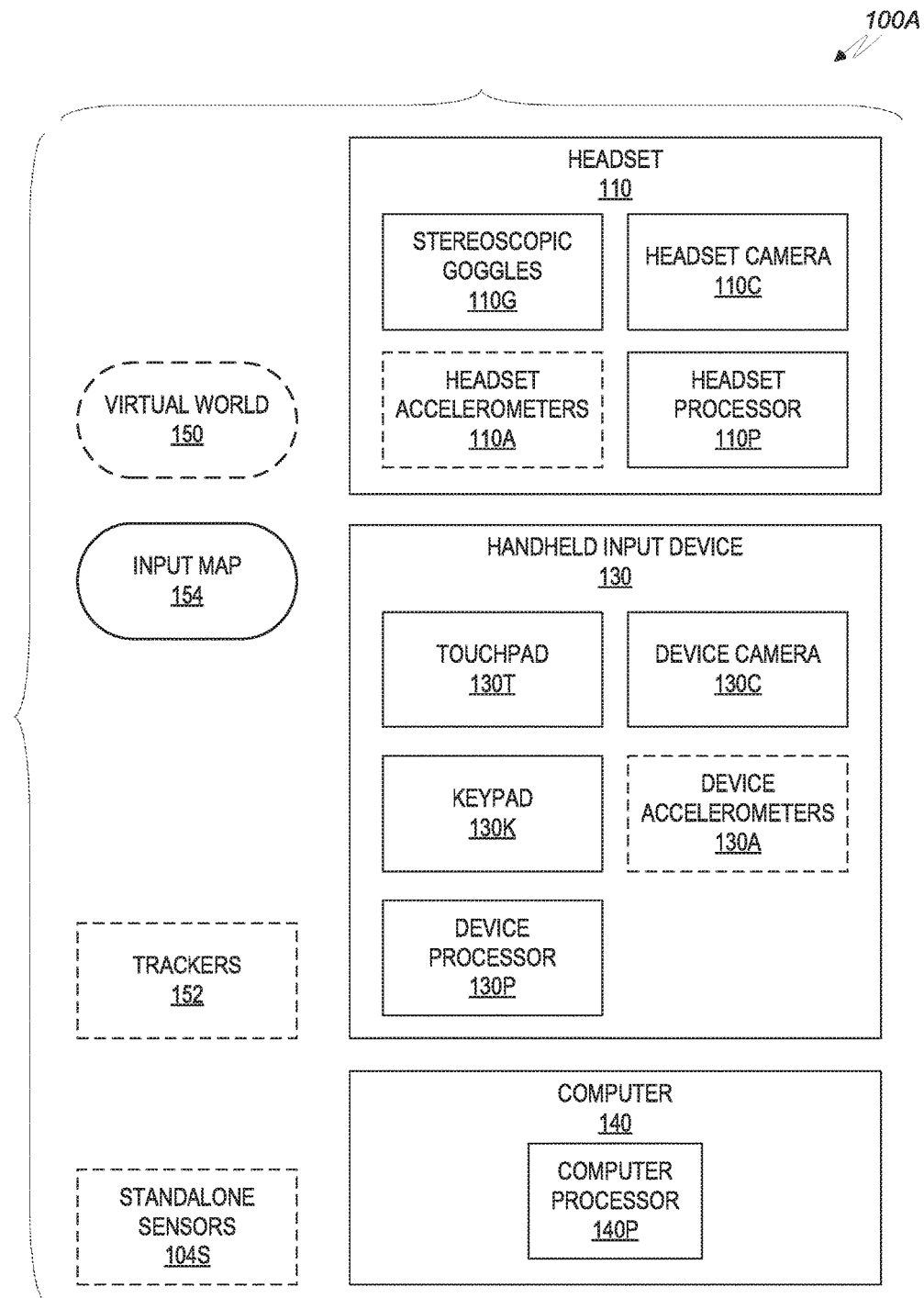
FIG. 1E relates to a system operating in scenario where a user wearing headset uses a handheld input device for a purpose that is unrelated to a virtual world.

FIG. 1E relates to a system 100A operating in scenario where a user wearing headset 110 uses handheld input device 130 for a purpose that is unrelated to a virtual world, such as in an example of answering or placing a phone call or a text message related to the real world while still wearing a virtual reality headset. In such a case, the virtual world experience may be suspended, and related units, marked in FIG. 1E by dashed frames, may become temporarily inactive. Under the present scenario, also elaborated in FIG. 7B, only the relative positions between headset 110, handheld input device 130 and the user's fingertip matter for a realistic input experience. Accordingly, the following "lean" camera roles may still provide satisfactory realistic experience: (i) device camera 130C being used merely for tracking headset 110; and (ii) headset camera 110C used merely for tracking the projection of the user's fingertip upon handheld input device 130. In an alternative, even leaner embodiment, the headset camera 110C is used both for determining the relative position between headset camera 110C and handheld input device 130 and tracking the projection of the user's fingertip upon handheld input device 130. In both cases above, the projection of the user's fingertip upon handheld input device 130 is considered as the fingertip's "position".

Real-World Devices, Input Maps and Virtual Devices

FIGS. 2A-2D illustrate several embodiments of real-world handheld input devices 130 held by the user, inputs maps 154, and the corresponding virtual handheld input devices as seen by the user within the virtual world using headset 110. It will be appreciated that the user is expected to properly and conveniently operate the real-world handheld input device while wearing a headset and observing a fingertip marker located and moving in the virtual world relatively to the virtual input device.

Figure 2A:
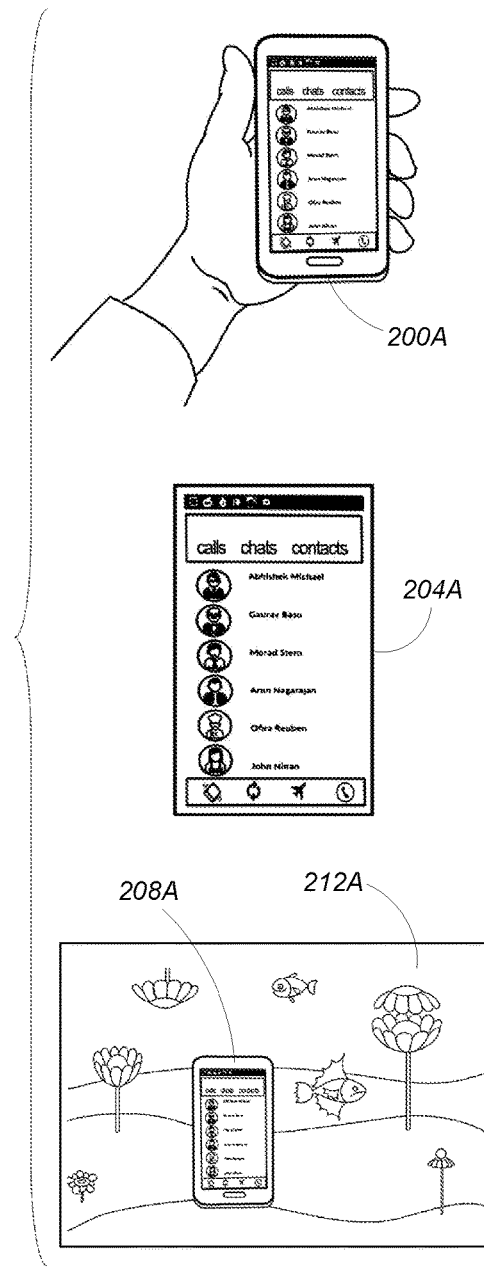
FIGS. 2A-2D illustrate several embodiments of real-world handheld input devices held by the user, inputs maps, and the corresponding virtual handheld input devices as seen by the user within the virtual world using headset.

FIG. 2A demonstrates a smartphone 200A held by the user so that it faces headset 110. Smartphone screen input map 204A shows a smartphone screen that actually replicates the current screen of smartphone 200A. This can be done, for example, by capturing the screen image of the smartphone 200A by an app running on the smartphone 200A and then transmitting the screen image so it can be viewed by the headset 110, or by running the device 130 app on a virtual machine on computer 140 and capturing the screen there, in which case the input of the user will have to be transmitted to computer 140 for processing. Virtual smartphone 208A is what the user sees via headset 110 using virtual world 212A seen in the background. It will be noted that the embodiment of FIG. 2A maps, in smartphone screen input map 204A, a real-time copy of the real-world smartphone 200A into the virtual world, in the same relative position of the device 130 relative to the headset 110 in the real world, so the user has a realistic experience of seeing the device 130 within the virtual world. The user also gets vision guidance toward a selected point on virtual smartphone 208A, via the assistance of a fingertip marker (not shown in the present figure), that will effectively help the user in touching a selected point on smartphone 200A that actually displays the desired function, such as a selected contact person name. It will be further appreciated that the graphics actually displayed on smartphone 200A is not directly seen by the user, hence it may be redundant. It will be further appreciated that the view of the virtual world 212A is responsive to the user virtual position within the virtual world 150 and may be continuously changing according to changes in the user position. It will be noted that although the example shows a messaging app, it can also be a smartphone app relevant to the virtual worlds. For example, it can be a variation of a mobile app that is used to control a multirotor in the real world which will be used in the present virtual reality implementation to control a virtual multirotor within the virtual world with the same functions used in the real-world. Moreover, the handheld input device 130 may be a specialized touchpad or keypad that is used to control an object in real life. For example, a specialized touchpad 130T or keypad 130K that is used to control a robot can be used within the virtual world to control an equivalent virtual robot.

Figure 2B:
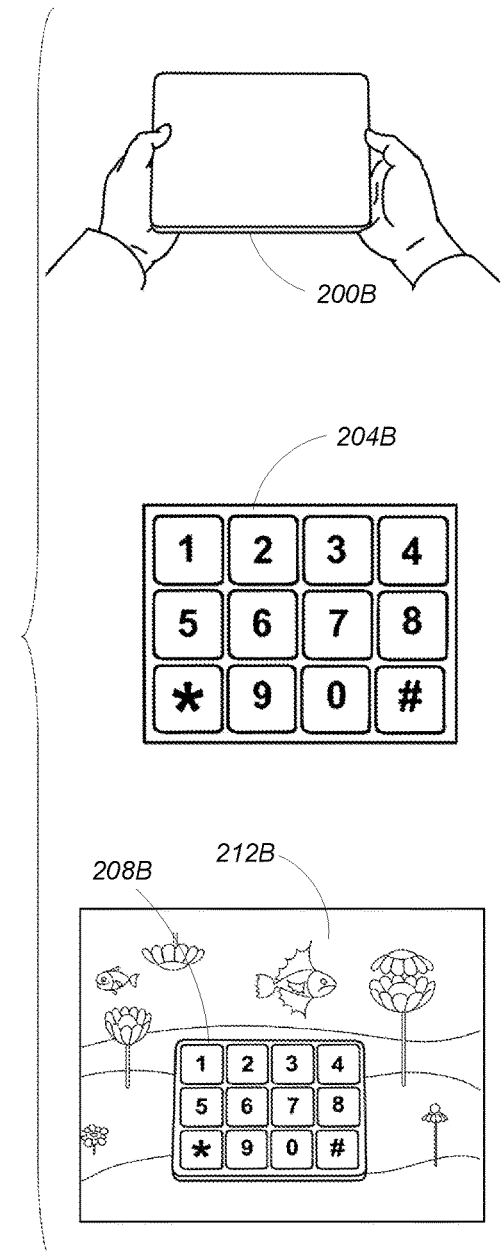

FIG. 2B emphasizes that the actual content displayed on handheld input device 130 may be redundant, by an example of an embodiment of a blank touchpad 200B, which is operated in virtual world 212B as a realistically-looking virtual numeric touchscreen 208B by processors 190 loading numeric touchscreen input map 204B. Thus, the user seeing the character "8" on virtual numeric touchscreen 208B and, assisted by a fingertip marker (not shown in the present figure) will press the corresponding point on blank touchpad 200B, which will effectively enter the character "8" into processors 190 that is aware of numeric touchscreen input map 204B.

In will be noted that the real-world positions of both smartphone 200A and blank touchpad 200B currently straightly face the headset 110 of the user so that the corresponding virtual device representation virtual smartphone 208A and virtual numeric touchscreen 208B are positioned for a realistic experience by the user who holds and touches the device in the real world while viewing it in the virtual world.

Figure 2C:
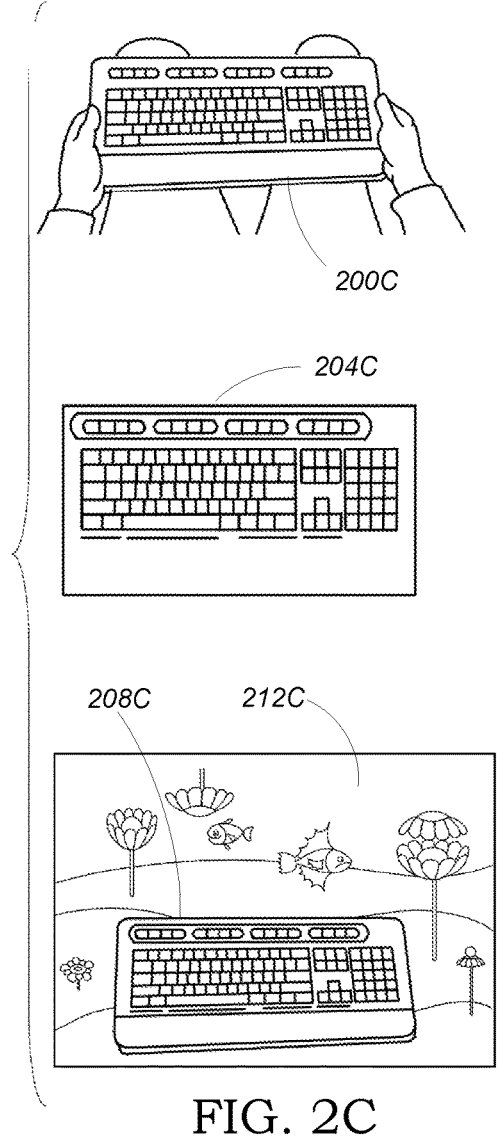

FIG. 2C demonstrates a physical keyboard 200C resting on the user's hips. Naturally, the user will direct headset 110 toward his hips for operating the keyboard, and the relative position of headset 110 with respect to keyboard 200C will be detected by device position sensors 170. Keyboard input map 204C is similar to a copy, in the present example, of the layout of keyboard 200C. The user wearing headset 110 sees, within virtual world 212C, virtual keyboard 208C located and oriented realistically according to the current actual relative position of keyboard 200C relative to headset 110.

Figure 2D:
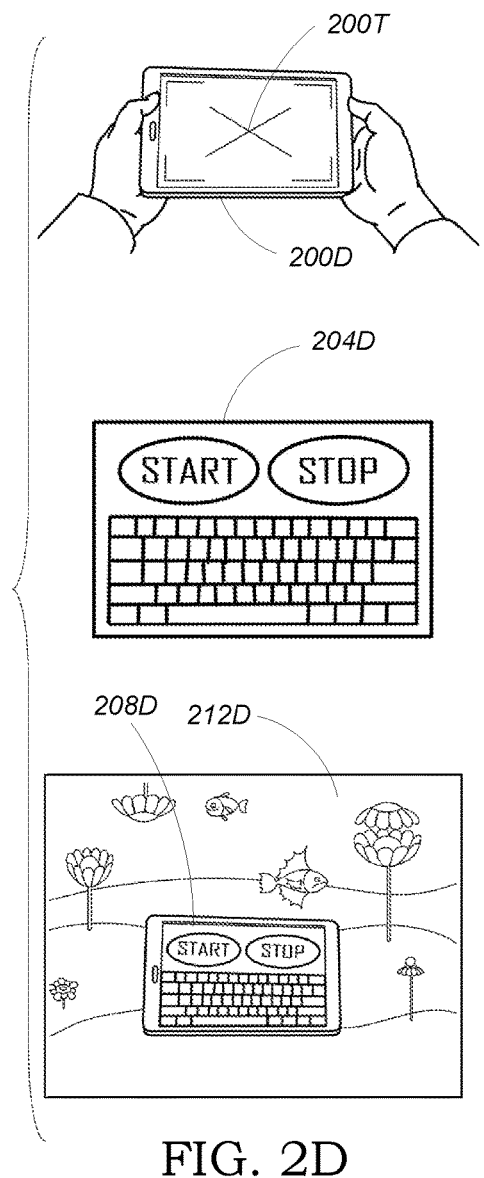

FIG. 2D demonstrates a real-world tablet 200D that shows on its screen just a visual tracker 200T that assists headset camera 110C and optionally standalone sensors 104S in determining the current position of tablet 200D. Tablet input map 204D includes a keyboard and two buttons marked "start" and "stop", which affects the introduction of virtual tablet 208D into virtual world 212D. It will be appreciated that the user wearing headset 110 holds, positions and feels tablet 200D in the real world, yet sees only virtual tablet 208D realistically immersed in virtual world 212D.

The Real-World Space

Figure 3A:
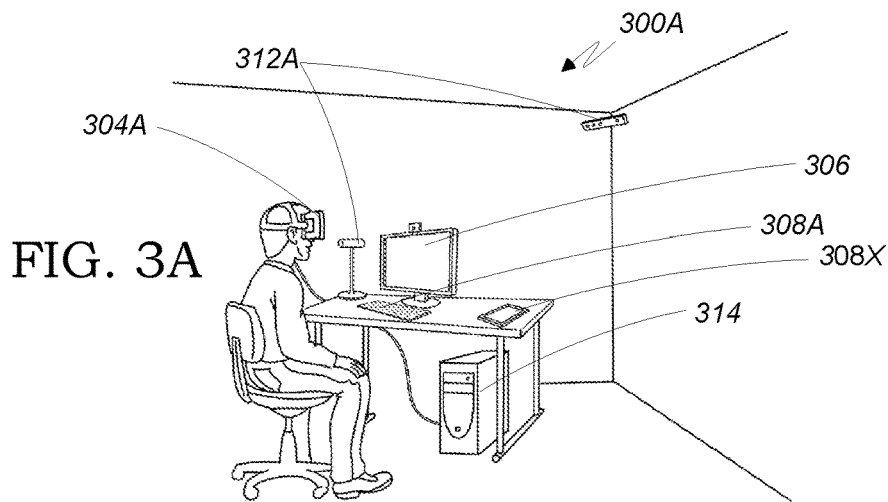
FIGS. 3A-3C demonstrate alternative setups of the real-world space of FIG. 1A.
Figure 3B:
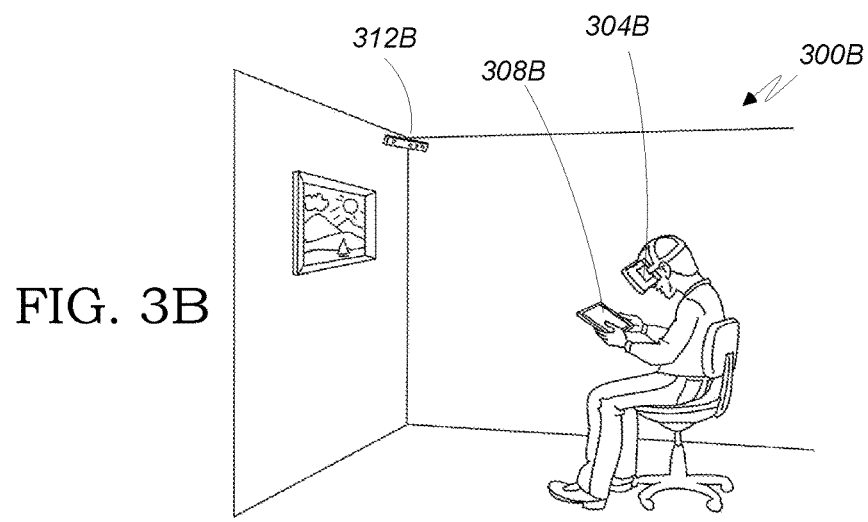
Figure 3C:
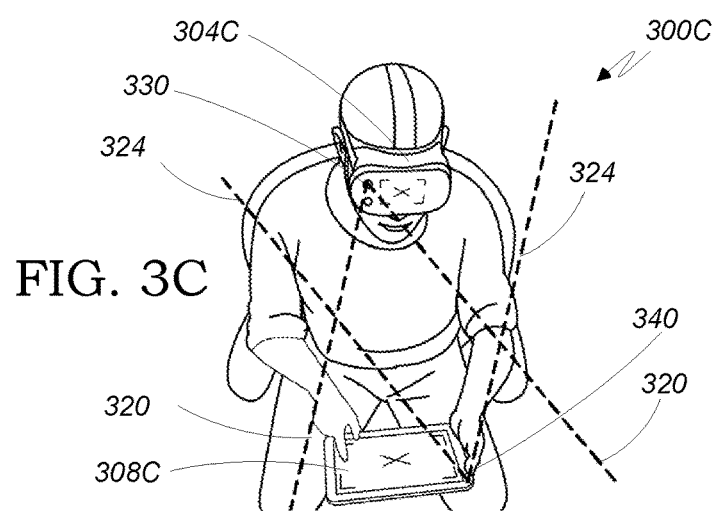

FIGS. 3A-3C demonstrate alternative setups of real-world space 104 of FIG. 1A. FIG. 3A shows real-world space 300A where the user is seated next to a desk wearing headset 304A. Computer 314 represents computer 140 of FIGS. 1A and 1s connected to headset 304A via a wired connection. Standalone sensors 312A, such as camera(s) and/or RF sensor(s), play the roles of standalone sensors 104S of FIG. 1A. The user can choose between keyboard 308A or tablet 308X as handheld input device 130. Screen 306 of computer 314 does not play a role within the context of the virtual reality experience discussed herein. Headset 304A and standalone sensors 312A may include cameras and sensors that participate in positioning headset 304A, user hands/palms/fingers, and keyboard 308A or tablet 308X in the real world.

FIG. 3B shows real-world space 300B where a user wears headset 304B and holds tablet 308B, while headset 304B and/or standalone sensor 312B may include camera(s) that participate in positioning headset 304B, tablet 308B, and user palms or fingertips in the real world. Processors 190 (FIG. 1D) include just the processors of tablet 308B and headset 304B for performing all the real-world positioning-related calculations as well as rendering the virtual world, while all units within real-world space 300B communicate wirelessly in this example.

FIG. 3C shows a lean real-world space 300C that includes just the user wearing headset 304C and a tablet 308C. Headset camera 330 captures tablet 308C and the user's fingertip within its headset camera field-of-view 320, while device camera 340 optionally captures headset 304C within its device camera field-of-view 324. One or both processors of headset 304C or tablet 308C process the captured images for calculating and determining the relative position of headset 304C and the user's fingertip with respect to tablet 308C.

Using a 3D Headset Camera

Figure 4A:
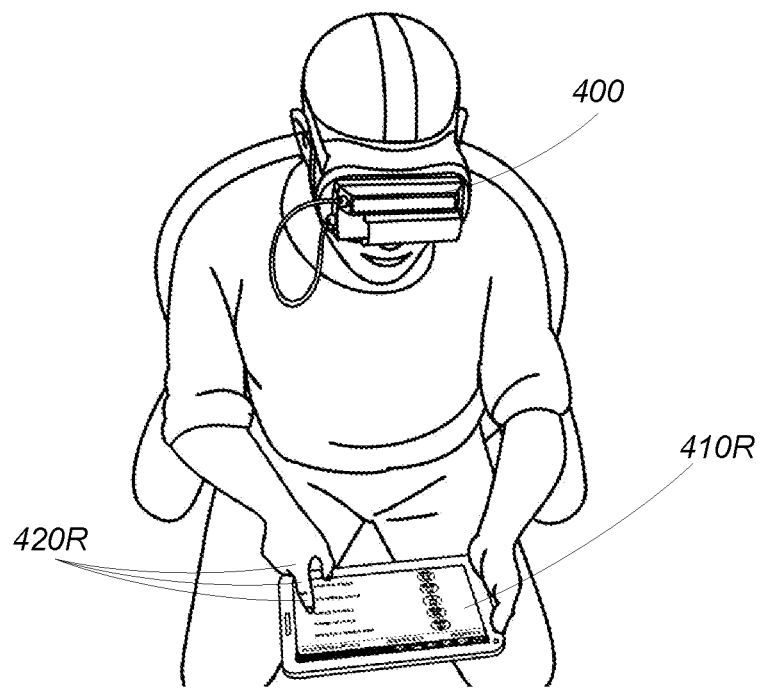
FIG. 4A demonstrates a user wearing a headset with a 3D camera viewing a tablet and a palm.
Figure 4B:
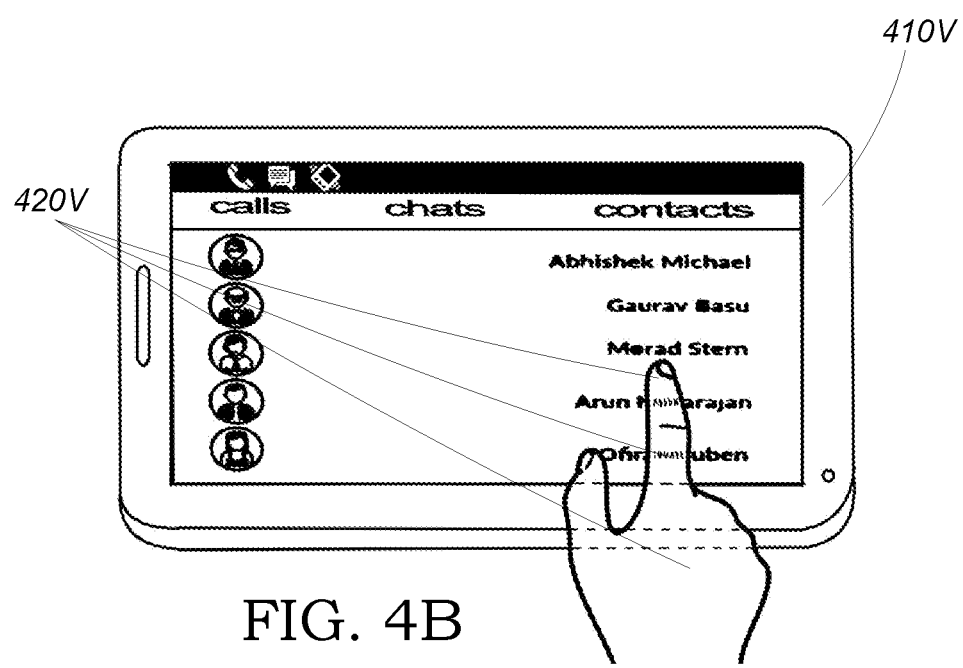
FIG. 4B depicts the virtual counterparts that the user sees via the headset.

Using a headset that includes a three-dimensional camera may improve the overall realistic experience by introducing stereoscopically-viewed palm-like fingertip marker into the virtual world. FIG. 4A demonstrates a user wearing a headset with a 3D camera 400 viewing tablet 410R and palm 420R. FIG. 4B depicts the virtual counterparts that the user sees via the headset: a stereoscopic virtual tablet image 410V, and a stereoscopic semitransparent virtual palm image 420V that is properly positioned to serve as a fingertip marker. 3D cameras that may be used for tracking the palm may include Intel Real-Sense camera (by Intel Corporation), or leap-motion (by Leap Motion Inc.). 3D camera may also help to accurately identify the device 130 location relative to the headset 110 by identifying the device by it shape and size. For example, in the case of a touchpad 130T, the depth map of the 3D camera can help to identify a surface that is in proximity to the camera and check if this surface has the characteristics of a touchpad. Also, a handheld input device 130 such as keypad 130K, can be identified according to its shape and size in addition to its visual. It will be appreciated that instead of using a three-dimensional camera within the headset, cooperation between device camera 130C, headset camera 110C and standalone sensors 104S, coupled with sufficiently-high image resolution and sufficient real-time processing power, may yield a similar stereoscopic experience as depicted above with reference to FIG. 4B.

Device Identification and its Usages

It may be advantageous to create a table of known devices with their respective characteristics, such as three-dimensional shape, visual look, tactile properties and size, that are fetched and communicated during the operation in order to help the device identification and positioning and make them more accurate. It can also support the calculation of the fingertip marker as well as refining the virtual representation of the device within the virtual world. For example, scanning a specific model of a keyboard can be used in order to visually identify it during operation; or mobile device identification can facilitate accurate positioning according to known characteristic offsets of its camera and its screen and support algorithms that better identify the device's relative touchscreen position; or, as another example, calculation the position of an object relative to a 3D camera based on its 3D model by using available algorithms, such as algorithms included in the Intel Real Sense SDK.

Using Visual Trackers

Determining the relative position of a device to an object may use visual trackers. A system may store in its memory one or more images selected to serve as visual trackers. A camera may then capture an image and process it in order to detect if any of the known visual trackers appears in the captured image. Upon detecting a visual tracker and in case that the real world size of the visual trackers is known, the location and orientation of the visual tracker relative to the camera can be calculated. The above process can be implemented using specialized software libraries and tools such as "Real-Sense" SDK by Intel or Vuforia by Qualcomm. For example, an app can run on a mobile device that will present a visual tracker on the screen. Then the headset Camera 110C can detect this tracker presented on the device screen and if device screen size is known then extract the device screen location and orientation relative to the headset camera 110C. Then an adjustment can be made in order to calculate the known specific offsets of the eyes in the specific headset 110 model compared to its headset camera 110C. The present description discusses headset position but it should be noted that some simple offset may be added to headset position in order to define the user's eyes relative position to the device, which is actually what is used in order to make the alignment of the real-world headset/eyes-device-fingertip to their virtual equivalents: user's position in the virtual world-virtual device-fingertip marker. The images and shapes of keyboards and some keypads can also be used as visual trackers. In the case of a 2D headset camera the image can also be used in order to build fingertip marker using the fingertip projection on the input device 130T as seen by the camera headset 110C. This may be done by using the position (including orientation) extracted from the visual tracker as explained above; the original visual tracker image and the headset camera 110C feed in order to extract the finger projection over the device thru using algorithms such as background subtraction.

Fingertip Markers

FIGS. 5A-5G demonstrate variation of fingertip markers in the virtual world that are seen by the user via the headset for the vision-assisted operation of a handheld input device in the real world.

Figure 5A:
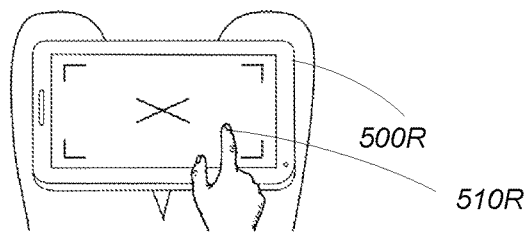
FIGS. 5A-5G demonstrate variation of fingertip markers in the virtual world that are seen by a user.

FIG. 5A demonstrates a real-world tablet 500R placed on the hips of a seated user, while the user's real-world fingertip 510R approaches the tablet. In the present exemplary embodiment, the real-world tablet screen is blank, except for a visual tracker that facilitates positioning of the table via headset camera 110C and/or standalone sensors 104S.

Figure 5B:
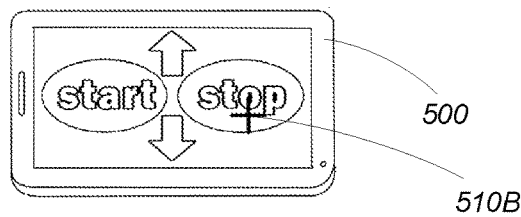
Figure 5C:
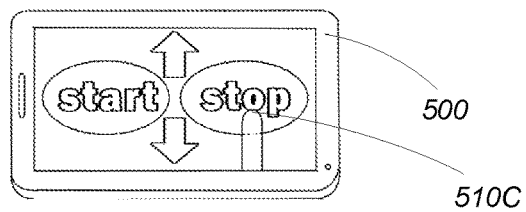
Figure 5D:
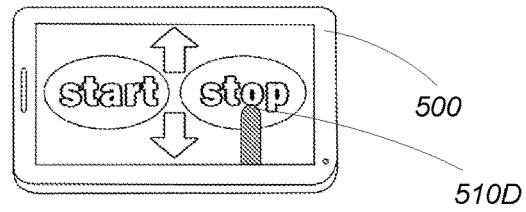
Figure 5E:
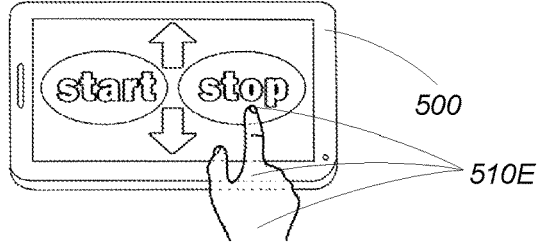
Figure 5F:
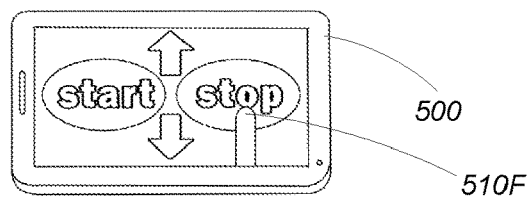
Figure 5G:
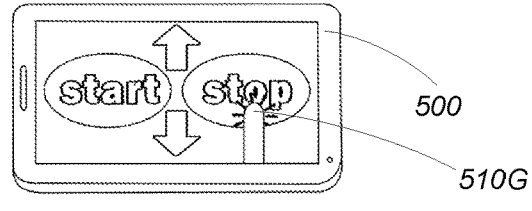

FIG. 5B demonstrates the virtual counterpart of the content of FIG. 5A, where virtual tablet 500 shows, according to a corresponding input map (not shown), four control buttons: "start", "stop", and two arrows. The fingertip marker 510B is shown as a cross-shaped cursor positioned according to the real-world relative position of the user's fingertip relative to the handheld input device. FIGS. 5C and 5D are similar to FIG. 5B, except that fingertip markers 510C and 510D appear as the tips of transparent or shaded finger dummies, respectively. FIG. 5E depicts a fingertip marker displayed as a realistic fingertip according to the teachings of FIGS. 4A-4B above. FIG. 5F demonstrates a fingertip marker represented by an opaque finger dummy approaching virtual tablet 500, while FIG. 5G adds a burst marking to the finger dummy at the moment that real-world tablet 500R detects a touch by the user's finger in the real world, which happens simultaneously with the user feeling the touch sensation upon touching the screen of tablet 500R.

Comparative Real World and Virtual World User Experience

FIGS. 6A-6E demonstrate a sequence of five steps of an exemplary vision-assisted input within a virtual world. Each figure illustrates actions made by the user in the real world, with the balloons showing what the user sees via his virtual reality headset.

Figure 6A:
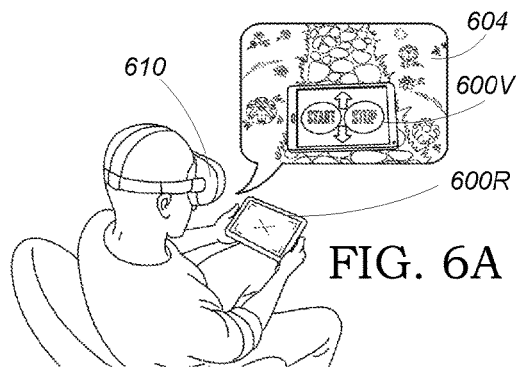
FIGS. 6A-6E demonstrate a sequence of five steps of an exemplary vision-assisted input within a virtual world.

In FIG. 6A the user wearing headset 610 holds a tablet 600R that is blank, except a visual tracker that assists the operating sensors and processors in determining the relative position of tablet 600R relative to headset 610 based on pictures taken by headset camera 110C and possibly also by standalone sensors 104S. What the user actually sees via headset 610 is a virtual tablet 600V immersed within virtual world 604. It will be noted that: (i) the image shown on virtual tablet 600V is determined by input map 154 and is unrelated to the image shown on real-world tablet 600R, and (ii) the virtual tablet 600V is realistically positioned within the virtual world 604 in a way that matches the current relative position of real-world tablet 600R relative to headset 610, and if the user changes the relative location and/or orientation of the real-world tablet 600R by moving the headset 610 and/or the tablet 600R, a corresponding change in the position of virtual tablet 600V will occur. For the sake of the present example, the user sees virtual tablet 600V and selects to press the "start" button. It will be also noted that if the user changes the headset 110 position in the real world, also the view of the virtual world 604 will be adjusted accordingly. For clarity, the present sequence of FIGS. 6A-6E assumes that the user does not change the real-world position of headset 110.

Figure 6B:
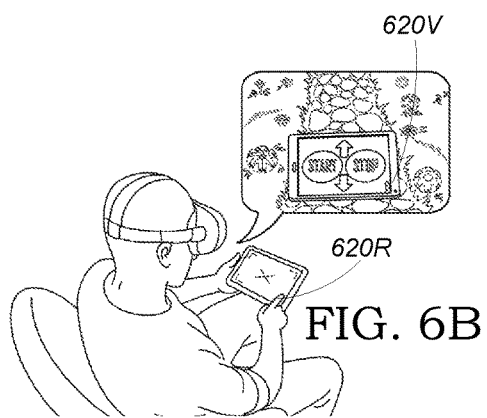
Figure 6C:
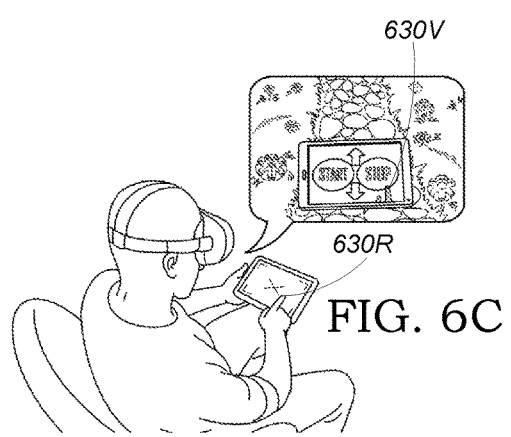
Figure 6D:
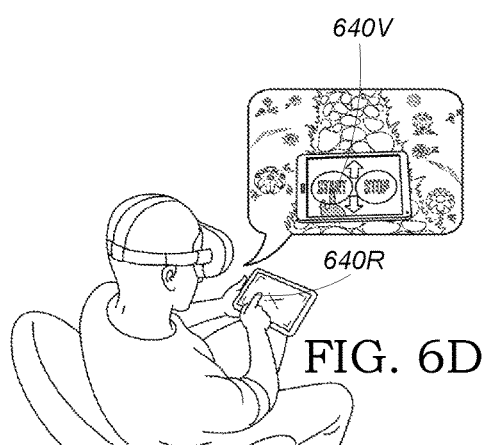
Figure 6E:
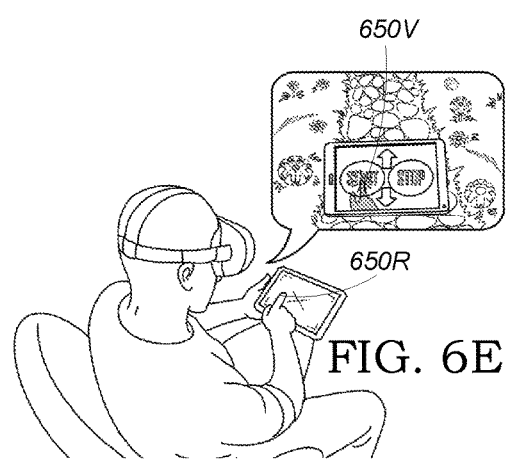

FIG. 6B shows the user moving his real-world fingertip 620R toward the tablet, which causes, via the operating cameras and processors, the appearance of fingertip marker 620V above virtual tablet 600V. In FIG. 6C the user further moves his finger toward the desired "start" button, which is seen only via the headset in the virtual world with no corresponding marking on the real-world tablet 600R, which causes fingertip marker 630V to further move toward the "start" button in the virtual world. In FIG. 6D the user's real-world fingertip 640R reaches the desired point above real-world tablet 600R, which causes fingertip marker 640V to show above the "start" button of virtual tablet 600V. In FIG. 6E the user real-world fingertip 650R touches the real-world tablet 600R, which causes: (i) the user feeling sensation of touching the tablet; (ii) the touch operation being visually highlighted on the image of fingertip marker 650V; and (iii) processors 190 ultimately receiving an input signal of "start", which affects a corresponding operation (not discussed herein).

Operation

Figure 7A:
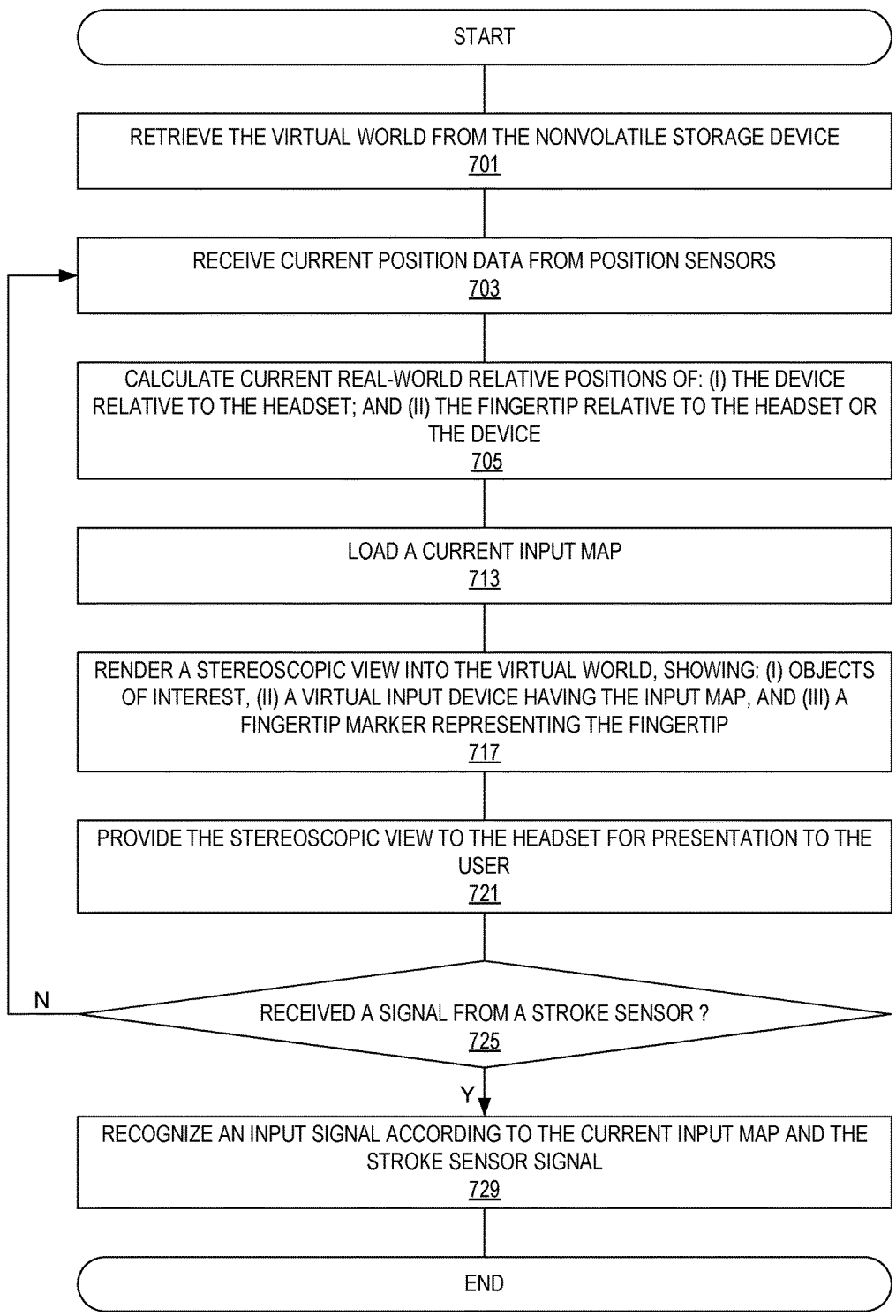
FIG. 7A describes the operation of a preferred embodiment of the present invention.

Reference is now made to FIG. 7A, which describes the operation of a preferred embodiment of the present invention. The process is executed by one or more of processors 190 of FIG. 1D. Prior or subsequent to step 701, a user wearing headset 110 is located in real-world space 104 while using handheld input device 130. In step 701, one or more of processors 190 retrieve the virtual world 150 from its nonvolatile storage device, the virtual world including backgrounds and objects of interest. In step 703, one or more of processors 190 receive current position data from headset position sensors 160, device position sensors 170 and fingertip position sensors 180. In step 705, one or more of processors 190 calculate the relative position of handheld input device 130 relatively to headset 110, and the relative position of the fingertip relative to the headset 110 or to the handheld input device 130, based on data received in step 703. In step 713, one or more of processors 190 load the current input map from the respective nonvolatile storage device of input map 154. It will be appreciated that step 713 may be skipped altogether, or be required once only and then may precede step 703, if the input functions of handheld input device 130 remain unchanged during operation, as may be the case, for example, where a keypad 130K that does not change its function during the present operation is used. In other cases, such as where handheld input device 130 represents a tablet or smartphone device having a touchscreen such as touchpad 130T, the respective input map may dynamically change, which requires repeatedly updating the input map via step 713. In step 717 one or more of processors 190 render a stereoscopic view into the virtual world that includes: (i) the backgrounds and objects of interest retrieved in step 701 as seen from the user position within the virtual world; (ii) a virtual input device that is similar in shape, size and kind to handheld input device 130 and is positioned in the virtual world according to the relative position of handheld input device 130 relatively to headset 110 in the real world, the virtual input device having the current input map displayed on its face; and (iii) a fingertip marker representing the current fingertip position in the virtual world according to the fingertip position in the real world calculated in step 705. In step 721, one or more of processors 190 provide the stereoscopic view to be viewed by the user wearing headset 110 via stereoscopic goggles 110G. Step 725 checks whether a stroke signal is received from handheld input device 130, which indicates that a key or button of keypad 130K is pressed or touchpad 130T is touched. If a stroke signal is detected in step 725, then step 729 recognizes an input signal according to the current input map and the stroke sensor signal is interpreted according to the current input map. If no stroke is detected in step 725, the process loops back to step 703 for another iteration. The input signal recognized in step 729 is subsequently used for purposes beyond the scope of the present discussion, such as inputting text, controlling operations, or manipulating graphics.

Figure 7B:
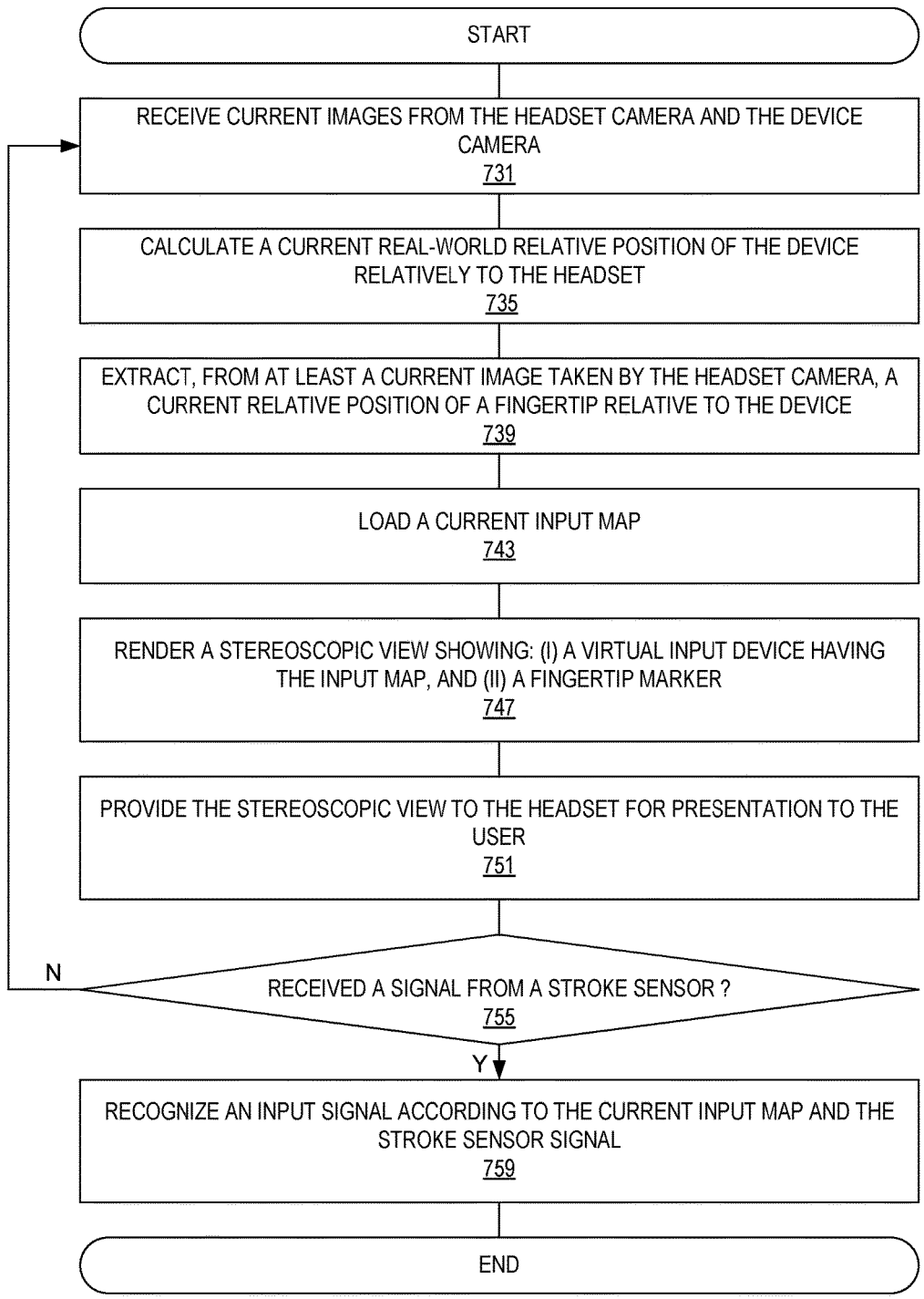
FIG. 7B depicts a leaner variation of the process of FIG. 7A.

FIG. 7B depicts a leaner variation of the process of FIG. 7A, for the case of system 100A of FIG. 1E, in which the virtual world experience may be suspended, and position sensing is based primarily on headset camera 110C and possibly also on device camera 130C. In step 731, one or more of processors 190 receive current images taken by headset camera 110C and possibly also by device camera 130C. In step 735, one or more of processors 190 calculate the current real-world relative position of handheld input device 130 relatively to headset 110 based the images received in step 731. In step 739, one or more of processors 190 extract and calculate, from at least the current image taken by headset camera 110C at least a current real-world relative position of a fingertip relative to the handheld input device 130. It will be appreciated that if headset camera 110C is a three-dimensional camera, the user's fingertip current position may be extracted is three dimensions, for subsequently providing in step 747 a more realistic viewing experience. In step 743, one or more of processors 190 load the current input map from the respective nonvolatile storage device of input map 154. It will also be appreciated that step 743 may be skipped altogether, or be required once only and then may precede step 731, if the input functions of handheld input device 130 remain unchanged during operation, as may be the case, for example, where a keypad 130K that does not change its function during the present operation is used. In other cases, such as where handheld input device 130 represents a tablet or smartphone device having a touchscreen such as touchpad 130T, the respective input map may dynamically change, which requires repeatedly updating the input map via step 743. In step 747 one or more of processors 190 render a stereoscopic view that includes: (i) a virtual input device that is positioned in the virtual world according to the relative position of handheld input device 130 relatively to headset 110 in the real world, the virtual input device representing the real-world handheld input device 130 and having the current input map displayed on its face; and (ii) a fingertip marker representing the current fingertip position in the virtual world according to the fingertip position in the real world extracted in step 739. In step 751, one or more of processors 190 provide the stereoscopic view to headset 110, to be viewed by the user wearing headset 110 via stereoscopic goggles 110G. Step 755 checks whether a stroke signal is received from handheld input device 130, which indicates that a key or button of keypad 130K is pressed or touchpad 130T is touched. If a stroke signal is detected in step 755, then step 759 recognizes an input signal according to the current input map and the stroke sensor signal interpreted according to the current input map. If no stroke is detected in step 755, the process loops back to step 731 for another iteration. The input signal recognized in step 759 is subsequently used for purposes beyond the scope of the present discussion, such as inputting text, controlling operations, or manipulating graphics.

While the invention has been described with respect to a limited number of embodiments, it will be appreciated by persons skilled in the art that the present invention is not limited by what has been particularly shown and described herein. Rather the scope of the present invention includes both combinations and sub-combinations of the various features described herein, as well as variations and modifications which would occur to persons skilled in the art upon reading the specification and which are not in the prior art.

What is claimed is:

1. A system for vision-assisted operation of a handheld input device while being immersed within a virtual world, the system comprising:
   a headset, that is a virtual reality headset wearable by a user;
   a device, that is a handheld input device having a plurality of stroke sensors;
   at least one device position sensor for sensing a real-world position of the device;

at least one fingertip position sensor for sensing a real-world position of a fingertip of the user; and
at least one processor programmed to:
  receive current device position data from the at least one device position sensor,
  receive current fingertip position data from the at least one fingertip position sensor,
  calculate: (i) a current real-world relative position of the device, relative to the headset, according to the current device position data, and (ii) a current real-world relative position of the fingertip, relative to the headset or to the device, according to the current fingertip position data,
  render a stereoscopic view into the virtual world, the stereoscopic view showing, at least: (i) a virtual input device having a current input map, the virtual input device positioned in the virtual world according to said current real-world relative position of the device, and (ii) a fingertip marker positioned relative to the current input map of the virtual input device according to said current real-world relative position of the fingertip,
  provide the stereoscopic view to the headset for presentation to the user,
  repeat said receive, calculate, render and provide steps until receiving a signal from a stroke sensor of the device, thereby providing the user with vision-assisted guidance for moving the fingertip relative to the device in the real world, and
  recognize an input signal according to the current input map and the signal received from the stroke sensor.

2. The system of claim 1, wherein all of the at least one device position sensor form part of the device.

3. The system of claim 1, wherein all of the at least one device position sensor form part of the headset.

4. The system of claim 1, wherein the at least one device position sensor include standalone sensors that do not form part of any of the device or the headset.

5. The system of claim 1, wherein all of the at least one fingertip position sensor form part of the headset.

6. The system of claim 1, wherein the at least one fingertip position sensor include standalone sensors that do not form part of any of the device or the headset.

7. The system of claim 1, wherein the processor is further programmed to load the current input map prior to said render step, and said repeat step further includes said load step.

8. The system of claim 1, further comprising:
  a nonvolatile storage device storing a virtual world that includes objects of interest;
  headset position sensors for sensing a real-world current position of the headset; and
  wherein said render step further includes rendering objects of interest from the virtual world according to the real-world current position of the headset.

* * * * *